(12) United States Patent
Bungenstock et al.

(10) Patent No.: US 11,243,358 B2
(45) Date of Patent: Feb. 8, 2022

(54) JOINT LAYOUT AND METHOD FOR JOINING COMPONENTS AND LIGHT GUIDE ELEMENT FOR USE THEREIN

(71) Applicant: Hella GmbH & Co. KGaA, Lippstadt (DE)

(72) Inventors: Carmen Bungenstock, Kleinenberg (DE); Heinrich Schäfer, Bad Wünnenberg (DE); Janis Schäfer, Bad Wünnenberg (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/089,253

(22) Filed: Nov. 4, 2020

(65) Prior Publication Data

US 2021/0141161 A1    May 13, 2021

(30) Foreign Application Priority Data

Nov. 13, 2019   (DE) .......................... 102019130566.7

(51) Int. Cl.
  *G02B 6/36*    (2006.01)
  *G02B 6/38*    (2006.01)
  *G02B 6/44*    (2006.01)

(52) U.S. Cl.
  CPC ......... *G02B 6/3628* (2013.01); *G02B 6/3861* (2013.01); *G02B 6/44* (2013.01)

(58) Field of Classification Search
  CPC ....... G02B 6/3628; G02B 6/3861; G02B 6/44
  USPC .......................................................... 385/88
  See application file for complete search history.

(56) References Cited

U.S. PATENT DOCUMENTS 6,470,118 B1 * 10/2002 Uno ..................... G02B 6/4204
                                                              385/49
2016/0096353 A1 * 4/2016 Ferguson ............ B29C 35/0272
                                                              442/1

FOREIGN PATENT DOCUMENTS

DE        19604081 A1    8/1997
DE     102015212961 A1    1/2017

* cited by examiner

*Primary Examiner* — Jerry M Blevins
(74) *Attorney, Agent, or Firm* — Husch Blackwell LLP

(57) ABSTRACT

A joint layout is provided for the firm bonding of components by means of a light-activated joining agent. A light guide element is arranged at least in sections in a joint gap between the components. The light guide element is embedded into the joining agent in the joint gap, and light for activating the joining agent can be outcoupled from the light guide element in the joint gap. In this context, at least one spacer is arranged in the joint gap between the light guide element and at least one of the components.

8 Claims, 4 Drawing Sheets

JOINT LAYOUT AND METHOD FOR JOINING COMPONENTS AND LIGHT GUIDE ELEMENT FOR USE THEREIN

CROSS REFERENCE

This application claims priority to German Patent Application No. 102019130566.7, filed Nov. 13, 2019, the entirety of which is hereby incorporated by reference.

FIELD OF THE INVENTION

The present invention relates to a joint layout for the firm bonding of components by means of a light-activated joining agent, where a light guide element is arranged at least in sections in a joint gap between the components where the light guide element is embedded into the joining agent in the joint gap and where light for activating the joining agent can be outcoupled from the light guide element in the joint gap. The invention further relates to a joining method based on the inventive joint layout and a light guide element for use therein.

BACKGROUND

In numerous industrial and commercial applications, light-activated joining agents are used to firmly bond components. These are adhesives that cure on exposure to light, for example UV radiation, or their curing process is triggered by exposure to light. In this context, the curing process takes place significantly more quickly until a final strength is reached than with conventional adhesives that cure by heat treatment so that shorter process times can be achieved in production with light-activated joining agents. Light-activated joining agents are used in vehicle illumination devices, for example, to join the heat sink, holding frame and reflector.

One difficulty with light-activated joining agents stems from their use in joint gaps that cannot be adequately illuminated. This occurs primarily when joining opaque components, for example when the joint gap features a pronounced flat extension and can be illuminated only at the edges or when the joint gap features hidden undercuts or offsets. For such application cases, the state of the art knows the use of light guide element placed into the joint gap to guide light into the areas insufficiently accessible from the outside in order to activate the joining agent.

DE 196 04 081 A1 for example discloses a method for joining components, specifically motor vehicle body parts by means of a UV curing adhesive that is irradiated and cured following application to the components by means of a UV laser, where at least one glass fiber is placed into the bulge of the adhesive applied to the components into which bulge the radiation from the UV laser is incoupled thus enabling the even those bonding surfaces of the component assembly that are not directly accessible to be cured.

Furthermore, US 2016/0096353 A1 discloses a joint layout of two components with light-curing adhesive arranged between them and at least one laterally light-emitting light guide element arranged in the adhesive between the components.

One disadvantage of such solutions from the state of the art is the lack of precision in the positioning of the light guide element in the joint gap. To achieve the maximum strength of the joint, the joint surfaces on the components must be covered as completely as possible by the joining agent. Consequently, it must be ensured that any light guide element embedded in the joining agent is ideally arranged exactly in the central plane of the joint gap, i.e. is separated from the facing joint surfaces of the components by an equally thick layer of the joining agent in each case. However, when pressing the components against each other into the final joint position, local pressure differences may arise within the viscous joining agent that lead to the corresponding forces being exerted on the light guide element that cause it to shift and/or bend. Furthermore, when using joining agents with a low viscosity, gravity may cause the light guide element to sink within the joint gap (despite the joint layout being set up correctly) until the light guide element comes into direct contact, at least in sections, with the joint surface of one of the components, resulting in incomplete coverage of the joint surface with joining agent in these areas and thus ultimately in a locally weakened adhesive bond. Especially when using flat light guide elements such as light guide films whose lateral extent essentially correspond to the dimensions of the joint surfaces the weakening of the joint through incomplete coverage may be significant. In addition, a change in the specific volume of the joining agent during the curing processes may also cause an unwanted repositioning of the light guide elements, for example shifting or bending in some sections. In the worst possible case, such movements of the light guide elements acting as a foreign body in the curing adhesive may cause the formation of fissures or other defects in the cured joining agent.

SUMMARY OF THE INVENTION

It is therefore the task of the present invention to propose a joint layout for the firm bonding of components by means of a light-activated joining agent and a light guide element embedded therein that overcomes the disadvantages of corresponding joint layouts from the state of the art and in particular guarantees precise and unchangeable positioning of the light guide element between the components.

This task is solved on the basis of a joint arrangement according to the preamble of claim 1 and an associated light guide element according to the preamble of claim 2, each in conjunction with the characteristic features. Advantageous embodiments of the invention are specified in the dependent claims.

The invention includes the technical contribution that at least one spacer is arranged in the joint gap between the light guide element and at least one of the components.

In this context, the invention is based on the idea of using one or preferentially several suitably positioned spacers to build up local form-locking connections between the light guide element and the components to be joined, where these connections in particular prevent an unwanted movement of the light guide element towards the joint surfaces of the components (for the purpose of better readability in the following, the description assumes a plurality of spacers but this should not exclude in any way the use of only one spacer). The dimensions of the spacers should be kept as small as possible such that their use does not result in a significant reduction in size of the effective joint surface. The spacers can be designed to be separated into individual elements and, for example, be glued onto the light guide element or the joint surfaces of the components, they are, however, preferentially a component of the light guide element used.

Consequently, the invention further relates to a light guide element for use in an inventive joint layout where the light guide element features at least one light outcoupling section with an upper side and a lower side and where at least one spacer is molded on the upper side and/or the lower side of the light outcoupling section. The light guide element might be an injection-molded product or be manufactured by means of an additive manufacturing method (3D printing). The light outcoupling section is that section of the light guide element that runs, embedded in the joining agent, along the joint gap between the components to be joined. The light outcoupling section correspondingly features a shape adapted to the joint gap and takes the form, for example, of a fibrous light guide or a light guide film or features a more complex shape. The light outcoupling is typically performed through all surfaces of the light guide element in particular through the upper side and lower side that face the joint surfaces of the components.

Preferentially, the spacers each take the form of a stud, a spherical cap, a cone, a pyramid or any other hump-shaped surface protrusion. The height of the spacers is to be dimensioned such that it essentially corresponds to the thickness of the joining agent layer that is applied between the upper or lower side of the light outcoupling section and the components. In the case of complex joint gaps, both the shape and the height of the spacer may vary as appropriate for the respective purpose.

As a further advantage, a plurality of spacers are molded on the upper side and/or the lower side of the light outcoupling section in a regular layout and/or in another layout adapted to the course of the joint gap. A regular layout, for example, takes the form of a hexagonal pattern on a light guide film or of an equidistant distribution along a filamentary light guide. The layout of the spacers is preferentially adapted to complex joint gap courses; for example, in sections of the joint gap running horizontally, the frequency of spacers may be higher than in sections running vertically, as the danger of a gravity-induced sinking of the light guide element in the joining agent is more significant in the sections running horizontally.

In an advantageous embodiment of the inventive light guide element, the light outcoupling section features at least one equalization opening, where the equalization opening forms an aperture that connects the upper side to the lower side of the light outcoupling section. Such equalization openings makes the light guide element locally permeable for the joining agent making it possible to equalize out pressure differences between the lower and upper half of the joint gap without the light guide element being repositioned or deformed in an undesired manner. Pressure differences in the joining agent may arise, for example, when moving the components to their final joined position or when the curing process of the joining agent begins. The provision of one or more equalization openings is therefore a measure supplementing the function of the spacers that contributes to stabilizing the light guide element in the joint gap and can be deployed in particular with flat light outcoupling sections, such as light guide films. In this context, the size of the equalization openings is preferentially adapted to the viscosity of the joining agent used.

The light outcoupling section preferentially features a plurality of equalization openings in a regular layout and/or in another layout adapted to the course of the joint gap. A regular layout of the equalization openings is particularly conducive to the reduction of pressure differences in geometrically simple joint gaps; in line with the layout of the spacers, the equalization openings may, for example, be arranged in the form of a hexagonal pattern on a light guide film, in particular symmetrically offset to the spacers. The layout of the spacers is preferentially adapted to complex joint gap courses; for example, in sections with a higher joint gap, i.e. with a locally raised thickness of the joining agent layer, a correspondingly higher frequency of equalization openings may be provided.

For the purposes of light outcoupling, the light outcoupling section preferentially features a plurality of light outcoupling elements by means of which light can be outcoupled from the light outcoupling section. The outcoupling elements take the form, for example, of microprisms or of other microstructures in the form of regular patterns or as random roughness on the surface of the outcoupling section and in particular arranged on its upper side and/or its lower site. The physical layout of the outcoupling elements is preferentially adapted to the course of the joint gap to be illuminated; for example, in areas where the thickness of the joining agent layer is increased, an increase in the thickness of outcoupling elements may be arranged.

The inventive light guide element preferentially features a feed section with a light incoupling surface where the feed section merges as one piece into the light outcoupling section. When using such a light guide element, the light source may be spaced at a distance from the joint layout and the light incoupled into the light incoupling surface, that typically does not feature any outcoupling elements, is guided into the light outcoupling section arranged in the joint gap. This embodiment is especially suitable for joint layouts with particularly inaccessible joint gaps. In a special embodiment of a light guide element with feed section, the light outcoupling section features a flat shape, where the feed section is designed to run along the surface normal towards the light outcoupling section.

The invention additionally relates to a method for joining components by means of a light-activated joining agent, where an inventive joint layout is manufactured with a light guide element in one of the aforementioned embodiments and where light is subsequently outcoupled from the light outcoupling section of the light guide element to activate the joining agent in the joint gap. In this context, the general term "light" is used to designate electromagnetic radiation whose wavelength is adapted to the specific joining agent used in such a way that, when irradiated, the joining agent cures or a curing reaction is triggered. As examples, reference can be made to adhesives that cure when exposed to electromagnetic radiation from the ultraviolet (UV) or visible part of the radiation spectrum.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
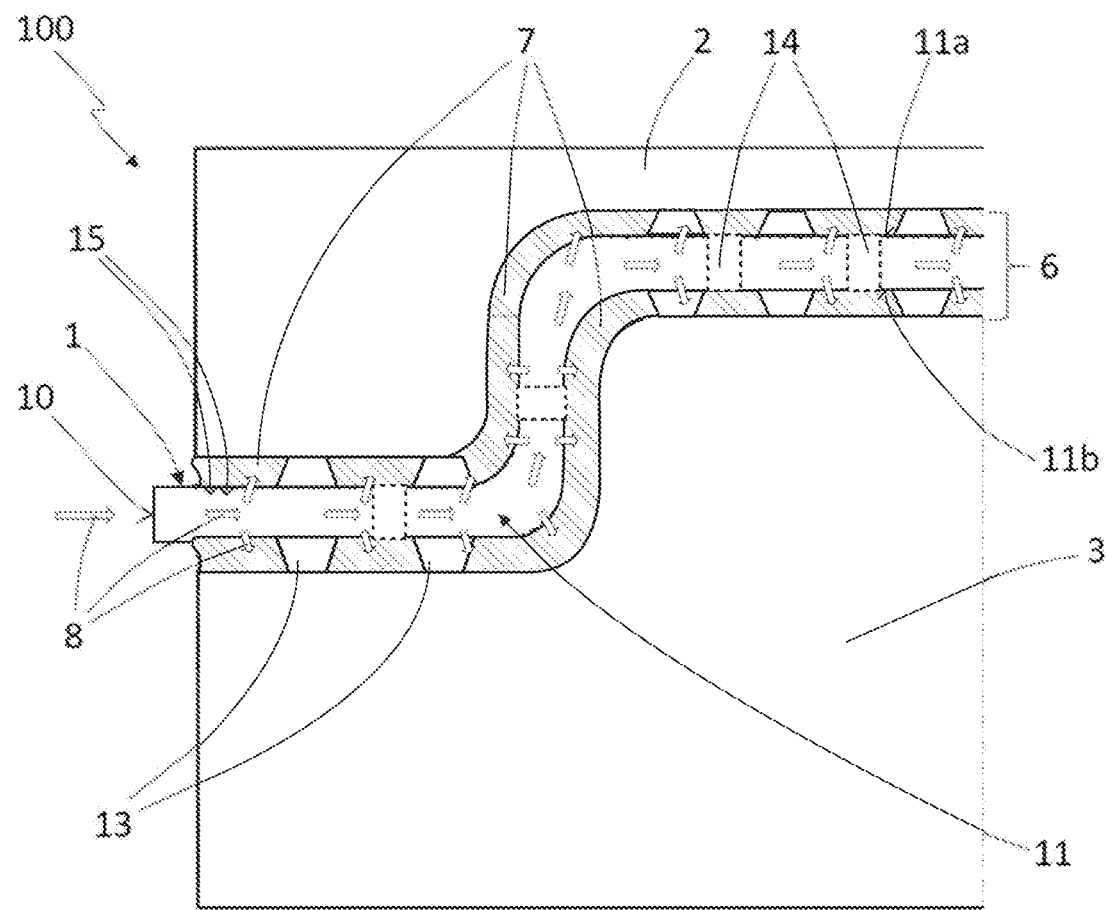
FIG. 1 is a cross-section view of an inventive joint layout.

FIG. 1 shows a cross-section of a section of an inventive joint layout 100 with the components to be joined 2, 3 and the light guide element 1 which is arranged in the joint gap 6 filled up with the light-activated joining agent 7.

The light guide element 1 comprises the front-end light incoupling area 10 for incoupling the light 8 required for activating the joining agent 7 and the light outcoupling section 11 running within the joint gap 6 with the upper side 11a facing component 2 and the lower side 11b facing towards component 3. Depending on the extension of the joint gap 6 along the normal direction of the drawing plane, the light guide element 1 is formed as a flat light guide film or as a filamentary light guide or the joint layout 100 comprises a plurality of light guide elements 1 arranged at distances adjacent to each other, where a more complex shape of the light guide element 11 varying along the joint 6 may be involved. For the purpose of light outcoupling, the outcoupling elements 15 in the form of microprisms and/or suitable surface structures are arranged along the light outcoupling section 11 (in the interest of simplicity, only two outcoupling elements 15 are shown in FIG. 1). The light 8 is refracted strongly at these elements and upon exceeding the boundary range of total reflection can leave the light outcoupling section 11 and trigger activation of the surrounding joining agent 7.

In the section of the joint layout 100 shown, the light outcoupling section 11 comprises ten spacers 13, of which five are molded on the upper side 11a and five on the lower side 11b. The layout of the spacers 13 is adapted to the course of the joint gap 6 by the spacers 13 being arranged on the sections of the joint gap 6 running horizontally. The spacers 13 feature a truncated cone shape and are dimensioned such that their height corresponds to the layer thickness of the joining agent 7 between the upper side 11a or lower side 11b and the joins of the components 2, 3 such that the light guide element 1 is brought into local contact with the components 2, 3 through the spacers 13. This means that the spacers 13 can develop the inventive supporting effect and, for example, prevent the light outcoupling section 11 from being pressed down or sinking due to gravity in the direction of the component 3 arranged below. This achieves a situation in which the light outcoupling section 11 is fixed at a central position between components 2, 3, such that the maximum possible coverage of the joint surfaces of components 2, 3 is ensured as well as a uniform layer thickness of the joining agent 7 between components 2, 3 and light outcoupling section 11 along the joint gap 6.

To further improve the positional stability of the light guide element 1 and the homogeneity and strength of the joint that can be formed, the light outcoupling section 11 in the section shown in FIG. 1 features four equalization openings 14. These consist, for example, of tubular or slit-shaped apertures between the upper side 11a and the lower side 11b through which the viscous joining agent 7 can pass. This makes it possible to reduce pressure gradients within the joining agent 7 without the position of the light guide element 1 being changed. Such equalization openings 14 are expedient primarily when using a flat light guide element 1, for example a light guide film or a light guide element 1 with flat sections.

Figure 2:
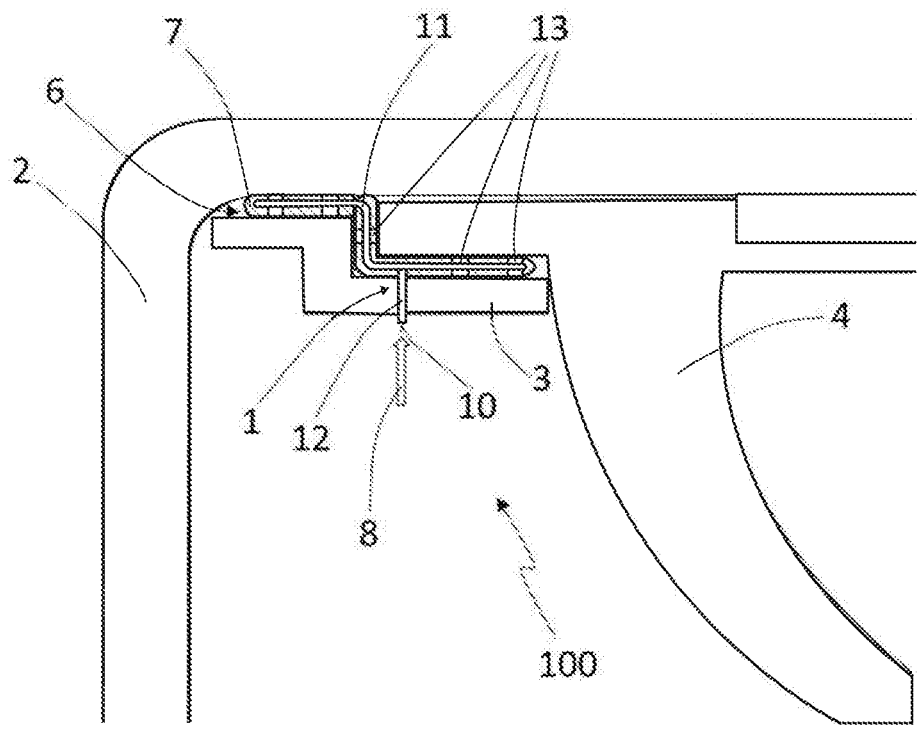
FIG. 2 is a cross-section view of an inventive joint layout.

FIG. 2 shows, as an example, the use of an inventive joint layout 100 for joining components 2, 3, 4 of an illumination device, in particular of a motor vehicle illumination device. In this context, component 2 represents a heat sink, component 3 a holding frame and component 4 a reflector. This means that the joint gap 6 runs between three components 2, 3, 4 to be joined to each other and is extremely inaccessible for an external light source. The light guide element 1 positioned in the light-activated joining agent 7 with the spacers 13 consequently features, additionally alongside the light outcoupling section 11 the feed section 12, which runs through a corresponding recess in the component 3. This makes it possible in principle for the light incoupling surface 10 on the front face of feed section 12 to be continued at any distance from joint gap 6, such that the connection to a light source for guiding in light 8 to activate the joining agent 7 can be implemented simply in practice. The feed section 12 does not feature any light outcoupling sections and merges as one piece into the light outcoupling section 11.

After the joining agent has cured, the light guide element remains permanently in the joint. When used in an illumination device, it would be possible in principle for an additional operating function to be assigned to the light guide element, for example that of a light guide for a signal lamp or for ambient illumination.

Figure 3A:
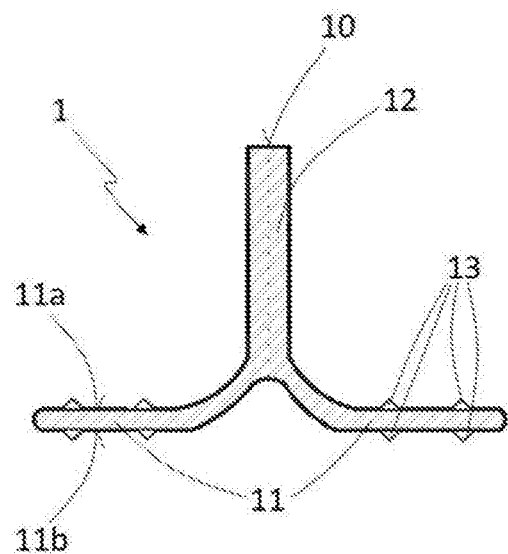
FIGS. 3a-3c are views of an inventive light guide element.
Figure 3B:
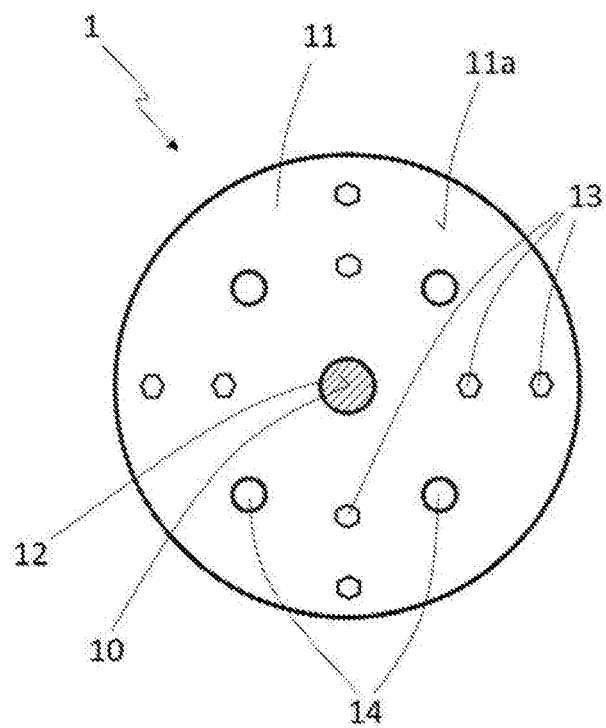
Figure 3C:
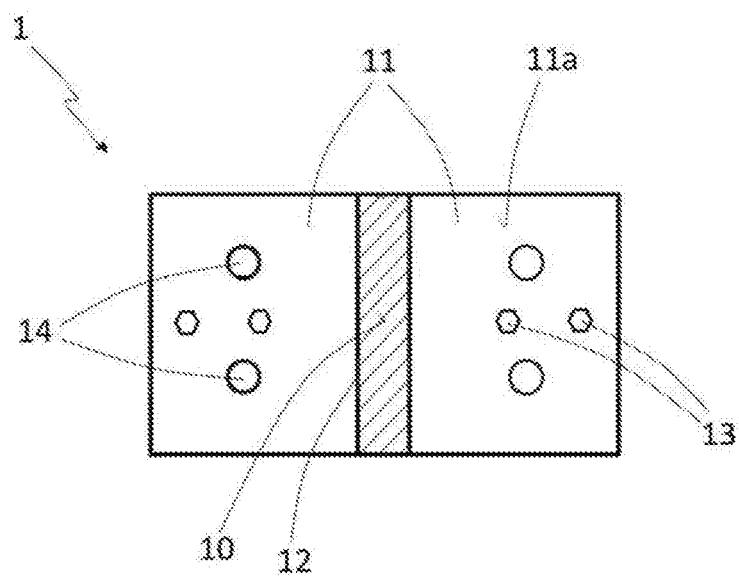

FIG. 3 a-c show a cross-section (FIG. 3a) and top views (FIG. 3b-c) of inventive light guide elements 1 in embodiments with a feed section 12 and a flat light outcoupling section 11, where the feed section 12 is designed to run along the surface normal towards the light outcoupling section 11. In this context, the light outcoupling section 11 features either a circular (FIG. 3b) or a rectangular border (FIG. 3c), where the respective light incoupling surface 10 takes the form of a circle or rectangle at the front face of the feed section 12 and the feed section 12 merges as one piece into the light outcoupling section 11. In the interest of simplicity, light outcoupling elements are not shown but are provided for on the upper side 11a and the lower side 11b of the light outcoupling section 11. In addition, there are eight (FIG. 3b) or four (FIG. 3c) spacers 13, respectively, molded on the upper side 11a and the lower side 11b in the form of cone-shaped elevations in a regular layout and in each case four tubular equalization openings 14 in a regular layout.

Figure 4:
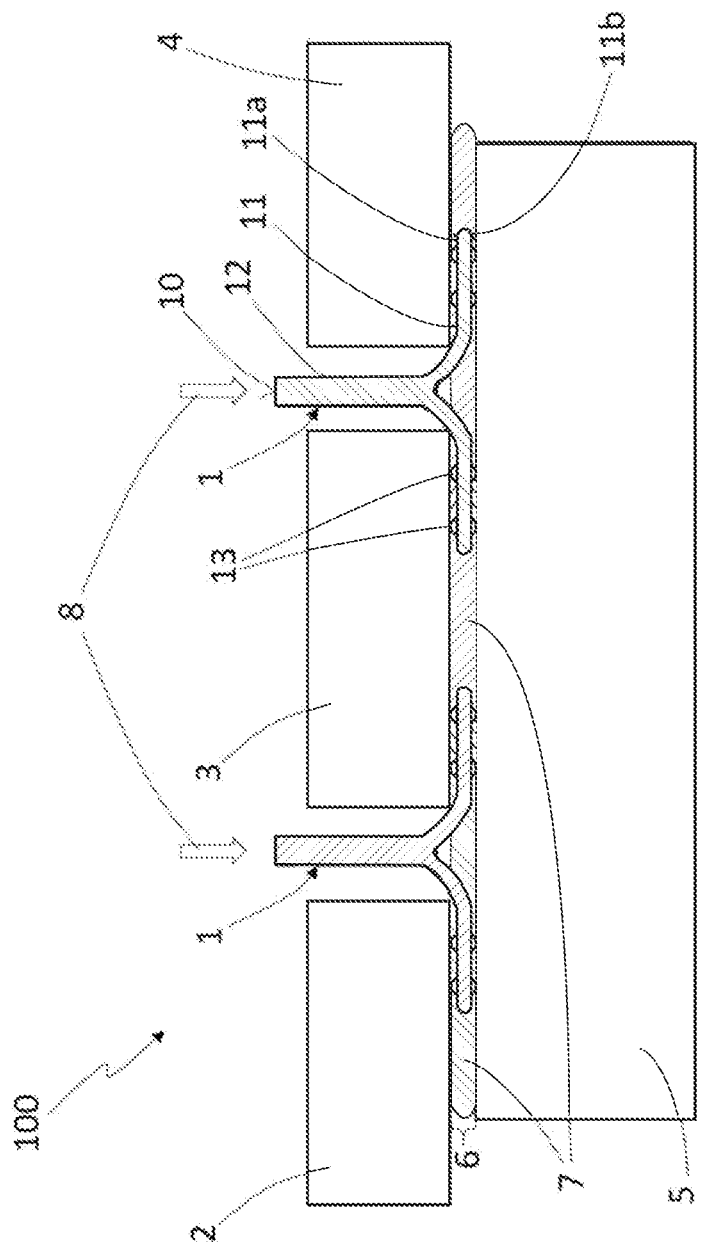
FIG. 4 is a cross-section view of an inventive joint layout.

FIG. 4 shows the use of light guide elements 1 according to the embodiments from FIG. 3a-c in an inventive joint layout 100 to join four components 2, 3, 4, 5. The joint gap 6 extends between the upper side of the component 5 and the respective lower sides of the components 2, 3, 4, where the joint gap 6 features interruptions between the components 2 and 3 as well as between components 3 and 4 which the feed sections 12 of the two light guide elements 1 are passed through. The flat light outcoupling sections 11 with the spacers 13 are embedded in the joining agent 7. The light 8 guided in through the light incoupling surfaces 10 for the purpose of activating the joining agent can exit through the upper sides 11a and the lower sides 11b of the light outcoupling sections 11 on account of outcoupling elements (not shown here in the interest of simplicity). In order to additionally illuminate the sections of the joint gap 6 lying between the light guide elements 1, light 8 may be outcoupled from the circumferential shell surfaces of the light outcoupling sections 11, i.e. the light outcoupling sections 11 in this example in particular do not feature any mirror coatings on the edges.

The design of the invention is not limited to the preferred sample embodiment specified above. Rather, a number of variants are conceivable, which make use of the present solution even in designs of a fundamentally different type. All of the features and/or advantages arising from the claims, description or drawings, including design details, physical layout and process steps, may be vital to the invention both by themselves and in a wide variety of combinations.

LIST OF REFERENCE NUMBERS

100 Joint layout
1 Light guide element
10 Light incoupling surface
11 Light outcoupling section
11a Upper side 11b Lower side
12 Feed section
13 Spacer
14 Equalization opening
15 Outcoupling element
2, 3, 4, 5 Component
6 Joint gap
7 Joining agent
8 Light

The invention claimed is:

1. A joint layout for firm bonding of components using a light-activated joining agent, the joint layout comprising:
    a light guide element arranged at least in sections in a joint gap between the components, wherein the light guide element is embedded into the joining agent in the joint gap;
    at least one spacer arranged in the joint gap between the light guide element and at least one of the components;
    wherein light is outcoupled from the light guide element to activate the joining agent in the joint gap; and
    wherein the light guide element includes at least one light outcoupling section with an upper side and with a lower side, wherein at least one spacer is molded on the upper side and/or the lower side of the light outcoupling section.

2. The light guide element of claim 1, wherein the spacer takes the form of a stud, a spherical cap, a cone, a pyramid or any other hump-shaped surface protrusion.

3. The light guide element of claim 1, wherein a plurality of spacers are molded on the upper side and/or on the lower side of the light outcoupling section in a regular layout and/or in another layout adapted to the course of the joint gap.

4. The light guide element in accordance with claim 1, wherein the light outcoupling section features at least one equalization aperture, where the equalization opening features an aperture that connects the upper side with the lower side of the light outcoupling section.

5. The light guide element in accordance with claim 4, wherein the light outcoupling section features a plurality of equalization openings in a regular layout and/or in another layout adapted to the course of the joint gap.

6. The light guide element in accordance with claim 1, wherein the light outcoupling section features a plurality of outcoupling elements by means of which light can be outcoupled from the light outcoupling section.

7. The light guide element in accordance with claim 1, wherein the light guide element features a feed section with a light incoupling surface, where the feed section merges as one piece into the light outcoupling section.

8. The light guide element in accordance with claim 7, wherein that the light outcoupling section features a flat shape, where the feed section is designed to run along the surface normal towards the light outcoupling section.

* * * * *